US00RE37178E

(19) United States
(12) Reissued Patent
Kingdon

(10) Patent Number: US RE37,178 E
(45) Date of Reissued Patent: May 15, 2001

(54) METHOD AND APPARATUS FOR AUTHENTICATION OF CLIENT SERVER COMMUNICATION

(75) Inventor: Kevin Kingdon, Fremont, CA (US)

(73) Assignee: Novell, Inc., Provo, UT (US)

(21) Appl. No.: 08/778,151

(22) Filed: Sep. 20, 1996

Related U.S. Patent Documents

Reissue of:
(64) Patent No.: 5,349,642
Issued: Sep. 20, 1994
Appl. No.: 07/970,611
Filed: Nov. 3, 1992

(51) Int. Cl.[7] ..... H04L 9/28
(52) U.S. Cl. ..... 380/25; 380/28; 380/30
(58) Field of Search ..... 380/23, 25, 28, 380/30

(56) References Cited

U.S. PATENT DOCUMENTS

| | | | |
|---|---|---|---|
| 4,405,829 | 9/1983 | Rivest et al. | 380/30 |
| 4,656,474 | 4/1987 | Mollier et al. | 380/23 |
| 4,799,258 | 1/1989 | Davies | 380/30 |
| 4,868,877 | 9/1989 | Fischer | 380/30 |
| 4,969,189 | 11/1990 | Ohta et al. | 380/30 |
| 4,995,082 | 2/1991 | Schnorr | 380/30 |
| 5,005,200 | 4/1991 | Fischer | 380/30 |
| 5,050,212 | 9/1991 | Dyson | 380/25 |
| 5,140,634 | 8/1992 | Guillou et al. | 380/30 |
| 5,210,795 | 5/1993 | Lipner et al. | 380/25 |
| 5,214,702 | 5/1993 | Fischer | 380/30 |

OTHER PUBLICATIONS

Bruce Lindsay and Virgil Gilgor, Migration and Authentication of Protected Objects, RJ2298 (31040) Aug. 14, 1978, Computer Science.

(List continued on next page.)

*Primary Examiner*—Salvatore Cangialosi
(74) *Attorney, Agent, or Firm*—Dinsmore & Shohl LLP

(57) ABSTRACT

The present invention provides a method and apparatus for message packet authentication to prevent the forging of message packets. After a message packet is created, a secret session key is preappended to the message, and a message digesting algorithm is executed on the altered message to create a message digest. A portion of the message digest, referred to as the signature, is then appended to the actual message when it is sent over the wire. The receiving station strips the signature from the message, preappends the same secret session key and creates its own message digest. The signature of the digest created by the receiving station is compared to the signature of the digest appended by the sending station. If there is a match, an authentic message is assumed. If there is no match, the message is considered as invalid and discarded. An advantage of the present invention is that the session key is never transmitted over the wire. The receiving station (server) already has the key and uses the key along with the message data to recalculate the message digest upon receiving the packet. The shared secret key (session key) is generated during initiation of the NCP session. In addition, cumulative state information is maintained by both the sending station and the receiving station. This state information is also used to authenticate messages.

44 Claims, 9 Drawing Sheets

OTHER PUBLICATIONS

Roger M. Needham and Michael D. Schroeder, Using Encryption for Authentication in Large Networks of Computers, Communications of the ACM. Dec. 1978, vol. 21, No. 12.
Henk Meijer and Selim Akl. Digital Signature Schemes, Cryptolgia, vol. 6, No. 4, Oct. 1982.
Christer Linden and Hans Block, Sealing Electronic Money in Sweden, Computers & Security 1 (1982) 226–230.
Selim G. Akl. Digital Signatures: A Tutorial Survey, Computer, Feb. 1983, IEEE.
R.R. Jueneman, S.M. Matyas and C.H. Meyer, Message Authentication with Manipulation Detection Codes, 1983 IEEE Symposium on Security and Privacy.
Taher Elgamal, A Public Key Cryptosystem and a Signature Scheme Based on Discrete Logarithms, IEEE Transactions on Information Theory, vol. IT–31, No. 4, Jul. 1985.
G. M. J. Pluimakers and J. van Leeuwen, Authentication: A Concise Survey, Computer & Security, 5 (1986) 243–250.
C. Fernandez, A. Vaquero, J. M. Troya and J. M. Sanchez, Automating the Computation of Authenticators for Interbank Telex Messages, Computer & Security, 6 (1987) 396–402.
June M. Power and Steve R. Wilbur, Authentication in a Heterogenous Environment, Computer & Security, 6 (1987) 41–48.
Per Christoffersson, Message Authentication and Enccryption Combined, Computers & Security, 7 (1988) 65–71.
Ramesh Karri, A Security Imbedded Authentication Protocol, 1988 IEEE INFOCOM.
Karen R. Sollins, Cascaded Authentication, 1988 IEEE Symposium on Security and Privacy.
Chris Mitchell, Dave Richard Michael Walker, A Remark on Hash Functions for Message Authentication, Computer & Security, 8 (1989) 55–58.
Martha Branstad, W. Curtis Barker, Pamela Cochrane, The Role of Trust in Protected Mail, 1990 IEEE Symposium on Security and Privacy.
William C. Barker, Use of Privacy–Enhanced Mail for Software Distribution, 1990 IEEE 5th Annual Computer Security Applications Conference.
Joseph J. Tardo and Kannan Alagappan, SPX: Global Authentication Using Public Key Certificates, 1991 IEEE Symposium on Security and Privacy.
Claus Fritzner, Lief Nilsen and Asmund Skomedal, Protecting Security Information in Distrbuted Systems, 1991 IEEE Symposium on Security and Privacy.
Selwyn Russell, Paradigms for Verification of Authorization at Source of Electronic Documents In an Integrated Environment, 1992 IEEE 8th Annual Computer Security Applications Conference.
Phil Joo Moon, Joon Won Lee, Moon Suk Jun. Chul Hee Lee, The New High–Speed Digital Signature, 1992 17th IEEE Conference on Local Computer Networks.
J. Galvin, K. McCloghrie, and J. Davin, SNMP Security Protocols, Jul. 1992.

METHOD AND APPARATUS FOR AUTHENTICATION OF CLIENT SERVER COMMUNICATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the field of network communications.

2. Background Art

Personal computers, or workstations, may be linked through a computer network to allow the sharing of data, applications, files, processing power, communications and other resources, such as printers, modems, mass storage and the like. Generally, the sharing of resources is accomplished the use of a network server. The server is a processing unit dedicated managing the centralized resources, managing data and sharing these resources with other PC's and workstations, often referred to as "clients". The server, network and PC's or workstations, combined together, constitute client/server computer network. An example of a client/server network model is illustrated in FIG. 1.

FIG. 1 illustrates a client machine 101 coupled to a server macabre 102. The client machine 101 may be a PC, workstation, etc. The server machine may be a dedicated processor, PC, workstation, etc, that includes mass storage on which files are stored. Typically, the mass storage is a disk drive or other suitable device.

The client machine 101 is comprised of a client 102 that communicates with a client stub 103. The client stub 103 communicates with a transport entity 104. The server machine 105 includes a server 106, server stub 107, and transport entity 108.

Referring to the client machine 101, the client 102 is a local processor that utilizes files of the server. The client stub 103 is a collection of local procedures that enable the client to access the server. The transport entity 104 provides access to the network, or "wire" 109. Wire 109 refers to the communications medium between the client and server and may be an actual hardwired communications medium, or may be a wireless connection. Similarly, the server stub 107 is a collection of procedures that enable the server to communicate with the client, and transport entity 108 provides access from the server to the wire 109.

In operation, communication between the client and server is in the form of requests (from the client) and replies (from the server). This communication is in the form of remote procedure calls. The client is analogous to an application calling a procedure and getting a result. The difference is that the procedure is not necessarily on the same machine as the client 101, but rather on the server machine 105.

Initially, the client 102 calls a stub procedure located on the client machine in the client stub 103 (resident in the client 102 local address space). The client stub 103 constructs a message from the call and provides it to the transport entity 104. The transport entity 104 communicates the message on the wire 109 to the server machine 105. At the server, the transport entity 108 passes the message to the server stub 107. The server stub then calls the appropriate server procedure front the server 106. The server 106 operates on the message and then returns the procedure and any result to the server stub 107. The server stub 107 constructs a reply message and provides it to the transport entity 108. The reply message is sent to the transport entity 104 of the client machine 101 over the wire 109. The transport entity provides the reply message to the client stub 103. The client stub 103 returns the procedure and any value returned by the server to the client 102.

On a computer network, clients and users have different levels of privileges. Certain functions, adding users, deleting users, changing passwords, etc., are restricted to the highest privileged users. These users and clients are often network administrators, and it is necessary for these users to be able to modify the network as necessary. In addition, there may be certain types of files or activities that are restricted from most users. For example, financial data is often restricted to users who have a need to know or use the financial data. Generally, other users are not permitted to access that data.

In a client/server model, messages are transported as "packets". An example of a message packet is illustrated in FIG. 3A. The message consists of a 4-byte length header (low high) indicator 301. The length header 301 identifies the length of the message that follows and includes the following information:

CheckSum
PacketLength
TransportControl
HPacketType
DestinationNet
DestinationNode
DestinationSocket
SourceNet
SourceNode
SourceSocket The length header 301 is followed by a request code 302. The request code 302 is the particular type of procedure being requested by the client. The request code 302 is followed by data 303. The data 303 may be of variable length.

One particular type of message packet is referred to as an "NCP packet", where NCP refers to NetWare Core Protocol. (NetWare is a trademark of Novell, Corporation of Provo, Utah). NetWare is an operating system for network systems. An NCP packet includes the following additional information in the length header:

packet type
sequence number
connection low
task
connection high

The standard portion of the message packet provides source address, destination address and length, among other pieces of information. The NCP portion includes a connection number and a sequence number. The station connection number provides the server with an index into a table of active stations. The server uses the active station table to track information about that station's session, including the station's network address and sequence number.

The connection number is used in part as a security check. When a server receives a request packet, it uses the packet's connection number as an index into its connection table. The request packer's network address must match the network address stored in the connection table entry corresponding to the connection number contained in the request packet. This is one method of validating a request packet.

The sequence number is also used to validate packets. The sequence number is a byte that is maintained by both the server and the client. When the client sends a request packet, that client increments the sequence number. Likewise, when a server receives a request packet, it increments that client's sequence number (stored in the server's connection table). The sequence number wraps around on every 256th request made by the client (because it is one byte in length).

Before incrementing the client's sequence number, the server checks the sequence number against a list of already-received request packets. This check is to ensure that the server does not service duplicate request packets. If the sequence number does not indicate a duplicate request packet, the server checks the request packet's sequence number against the sequence number stored in the server's connection table. If these two numbers are not equal, the server discards the packet.

In spite of these precautions, it is sometimes possible to forge a message packet by detecting the network address, connection station, the station's connection number, and the station's sequence number. Typically, the purpose in forging a message packet is to "imitate" a higher privileged user or client so that the privilege level of the forger can be upgraded. The forger may obtain a more privileged station's connection number by capturing network packets from the communications medium. These are network packets that are sent from a higher privileged station to the server. A forger may capture these packets using a protocol analysis tool.

By obtaining a connection number, a forger may attempt to forge a message by sending a message to the server destination address, using the same station connection number as in the intercepted message. However, that alone is not sufficient to enable an intruder to forge a message. As noted above, the server checks the sequence number and compares it against a list of already-received requests. The sequence number of the new request should have associated with it the next consecutive sequence number. If not, it is an invalid request and the server discards the packet.

An intruder may attempt to forge a message by "guessing" at the sequence number. Because the sequence numbers "wrap around" after 256, the intruder need only try to make 256 attempts before the sequence number is found. It should be noted that the intruder does not receive responses from the server, but rather must detect responses from the server or detect if a request issued to the server has been executed (e.g., a change in privilege status for the intruder).

One possible solution to a network intruder is to monitor network use to detect intruder-type activity. For example, the network could be monitored so that trial and error attempts to provide a correct sequence number are detected. For example, a window could be defined with a certain number of allowed failed tries at providing sequence numbers. A problem is that depending on the size of the window for allowed retries, an intruder could randomly provide a correct sequence number within the window. If the window is made smaller, legitimate transactions might be interrupted when the correct sequence number is not provided by a legitimate user. It is desired to provide a method and apparatus for preventing intruder network access instead of just detecting intruder access.

SUMMARY OF THE PRESENT INVENTION

The present invention provides a method and apparatus for message packet authentication to prevent the forging of message packets. After a message packet is created, a secret session key is preappended to the message, and a message digesting algorithm is executed on the altered message to create a message digest. A portion of the message digest, referred to as the signature, is then appended to the actual message when it is sent over the wire. The receiving station strips the signature from the message, preappends the same secret session key and creates its own message digest. The signature of the digest created by the receiving station is compared to the signature of the digest appended by the sending station. If there is a match, an authentic message is assumed. If there is no match, the message is considered as invalid and discarded. An advantage of the present invention is that the session key is never transmitted over the wire. The receiving station (server) already has the key and uses the key along with the message data to recalculate the message digest upon receiving the packet. The shared secret key (session key)is generated during initiation of the NCP session. In addition, cumulative state information is maintained by both the sending station and the receiving station. This state information is also used to authenticate messages.

DETAILED DESCRIPTION OF THE INVENTION

A method and apparatus for message authentication is described. In the following description, numerous specific details, such as message type, message length, etc., are provided in detail in order to provide a more thorough description of the present invention. It will be apparent, however, that the present invention may be practiced without these specific details. In other instances, well-known features are not described in detail so as not to unnecessarily obscure the present invention.

The present invention provides a signature with each message that identifies and authenticates the sender. In addition, the invention tracks state information about the session and uses its cumulative effect to help protect and authenticate senders.

The signature scheme of the invention takes advantage of an operation known as "message digesting". Message digesting is a scheme to provide data integrity and detect errors. There are a number of message digesting algorithms available for use, some of which are provided by Rivest, Shamir and Associates (RSA). RSA message digesting algorithms are known as MD2, MD4 and MD5. The preferred embodiment of the present invention utilizes a derivative of message digesting algorithm MD4. The MD4 algorithm is described in RFC 1320, "The MD4 Message-Digest Algorithm", R. Rivest, MIT Laboratory for Computer Science and RSA Data Security, Inc. April 1992, incorporated by reference herein. In the preferred embodiment of the present invention, the padding scheme described herein is used instead of the padding scheme described in the MD4 algorithm. However, the present invention may be used with any suitable padding scheme. In addition, the MD2 and MD5 digesting algorithms may be used as the digesting algorithm.

Other cryptographically secure, one way hashing algorithms may be used instead of a digesting algorithm without departing from the scope and spirit of the present invention. A hash function is a mathematical function that maps values from a large domain into a smaller range. In the preferred embodiment the hash function is such that the results of applying the function to a set of values in the domain will be evenly distributed (and apparently random) over the range. Using the present scheme, encryption of a message can be avoided, saving time, while still providing the benefit of an effective digital authentication signature.

MESSAGE SIGNATURE

Figure 1:
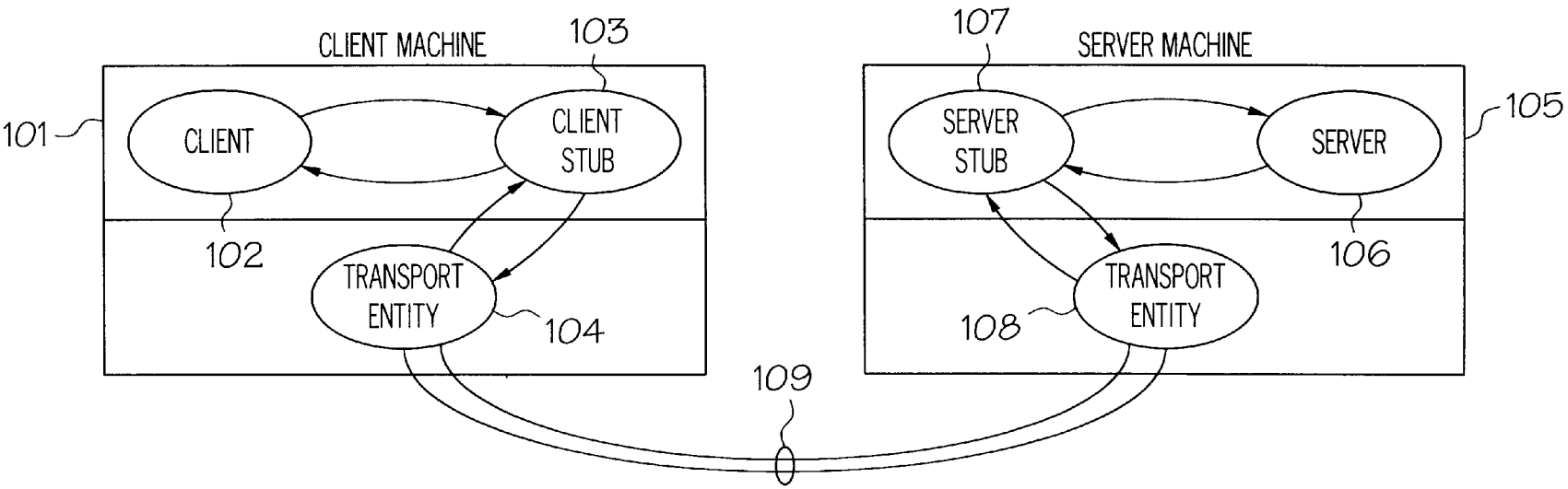
FIG. 1 is a block diagram of a client/server model.
Figure 2:
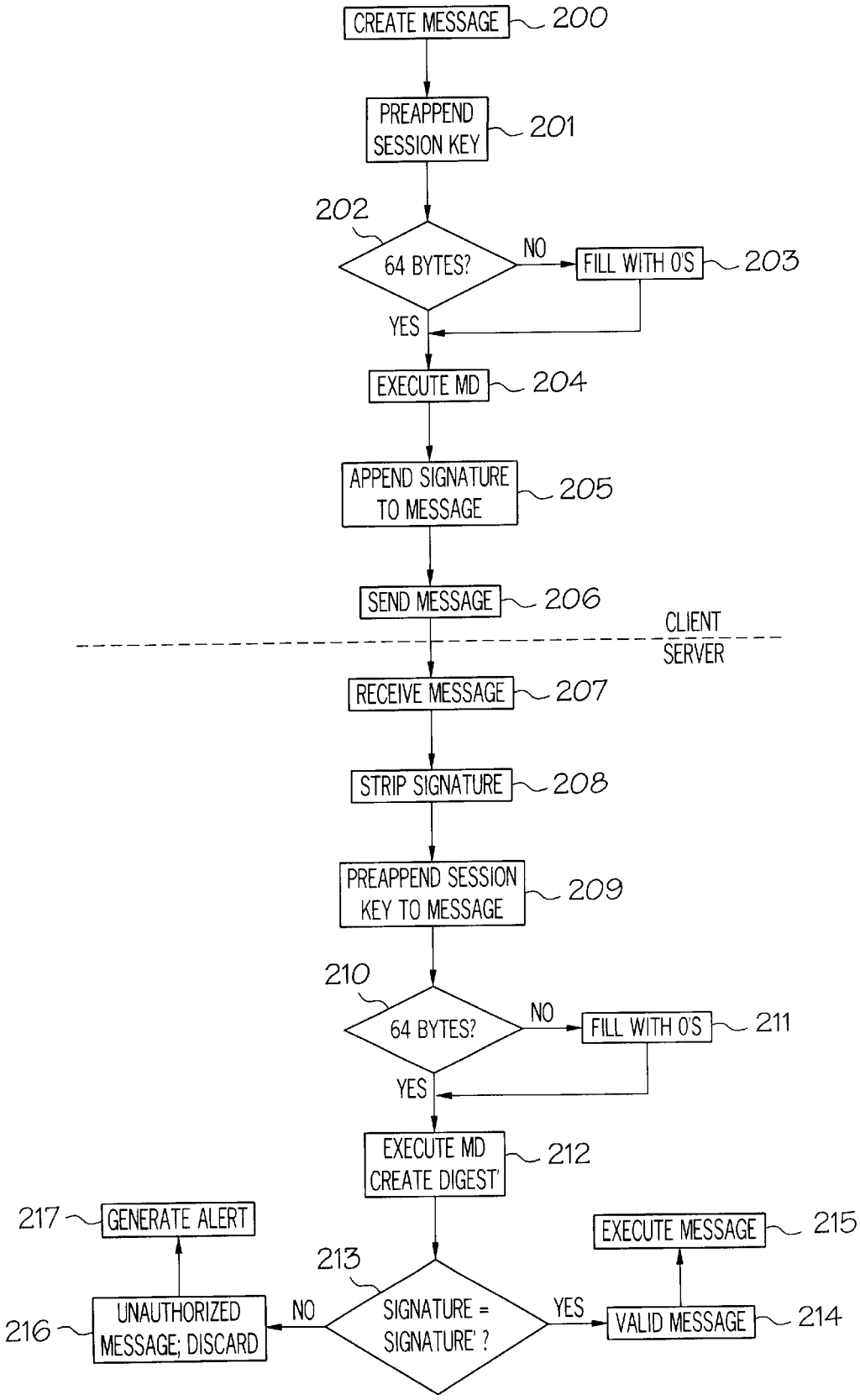
FIG. 2 is a flow diagram of a message session using the session key of the present invention.
Figure 3E:
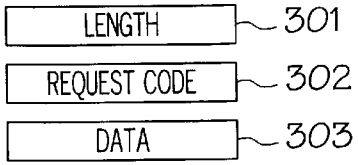
FIGS. 3A–3G are diagrams of message structure during a message session.
Figure 3D:
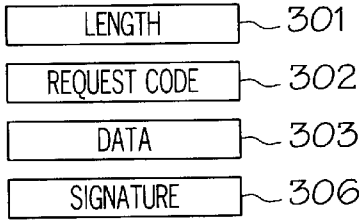
Figure 3B:
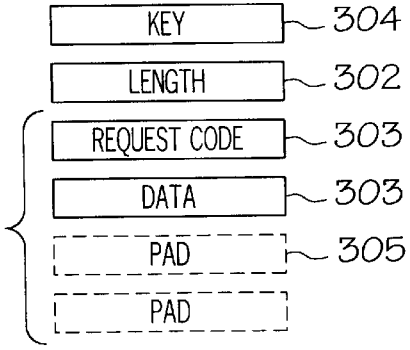
Figure 3A:
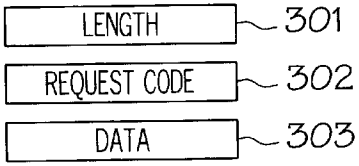

The method for creating and utilizing a signature to authenticate a message is illustrated in the flow diagram of FIG. 2. At step 200, a message is created by the client. This message is as shown in FIG. 3A. The message consists of a 4-byte length header (low high)indicator 301. The length header 301 identifies the length of the message that follows and includes source and destination information. The length header 301 is followed by a request code 302. The request code 302 is the particular type of procedure being requested by the client. The request code 302 is followed by data 303. The data 303 may be of variable length.

At step 201 a session key, whose creation is described in detail below, is pre-appended to the message. The prepending of the session key of step 201 of FIG. 2 is illustrated in FIG. 3B. An 8-byte key 304 is preappended to the message before the length indicator 301.

At decision block 202, the argument "64 bytes?" is made. If the argument is false, meaning the message does not have 64 bytes, the system proceeds to step 203 and the remainder of the message is filled with zeros. This is the padding 305 of FIG. 3B. In the preferred embodiment, the message digest algorithm requires 64 bytes for operation so that if necessary, padding 305 (consisting of zeros) is added to the end of the message. The request code and data total 52 bytes, with 4 bytes of the length indicated in 8 bits of the session key for a total of 64 bytes.

After step 203, or if the argument at decision block 202 is true, the system proceeds to step 204. At step 204, the message digest algorithm is executed to generate a message digest from the preappended message. The execution of the message digest algorithm creates the 16-byte message digest of FIG. 3C.

At step 205, the first eight bytes, i.e. the signature 306, of the digest is appended to the message. This is illustrated in FIG. 3D. The 8-byte signature 306 is added to the end of the actual NCP data. No padding is required for sending the message over the wire. At step 206, the message is sent to the server. Steps 200–206 are executed by the client, and steps 206–216 are executed by the server.

At step 206, the server receives the message. At step 208, the server strips the signature 306 from the message. The signature 306 is stripped from the message as illustrated in FIG. 3E.

Figure 3F:
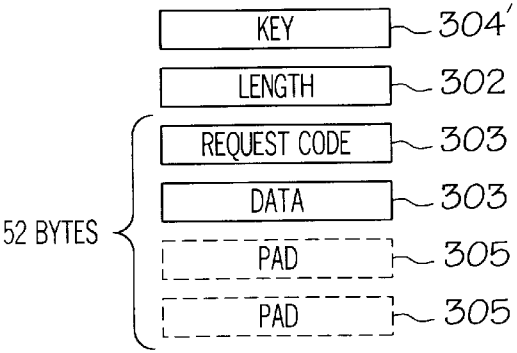

At step 209, the server pre-appends the session key generated and stored by the server (which should be the same session key as generated and stored by a valid user) to the message. This is illustrated in FIG. 3F where the server session key 304' is preappended to the message. At decision block 210, the argument "64 bytes?" is made. If the argument is false, the system proceeds to step 211 and fills the remainder of the message with zeros, as illustrated by padding 305 of FIG. 3F.

Figure 3G:
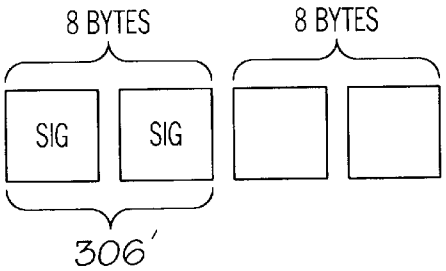
Figure 3C:
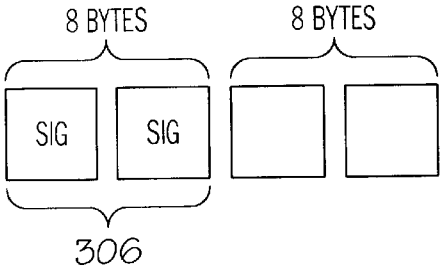

After step 211, or if the argument at decision block 210 is true, the system proceeds to step 212. At step 212, the MD4 algorithm is executed to create a server message digest, referred to here as digest'. This results in the 16-byte message digest of FIG. 3G. The first 8 bytes, i.e. signature '306' of this message digest are then stripped away and compared to the signature 306 that was sent with the message by the client.

At decision block 213, the argument "Signature= Signature'?" is made. This step is to determine if the signature generated by the client is the same as the signature' generated by the server. If the argument at decision block 213 is true, the system proceeds to step 214 and a valid message is indicated. At step 215, the message is executed. If the argument at decision block 212 is false, the system proceeds to step 216. At step 216, an unauthorized message is indicated and the message is discarded. At step 217, an alert is generated to indicate that an unauthenticated message was attempted.

The preferred embodiment of the present invention utilizes eight bytes of the digest as the signature. Any number of bytes or bits of the digest may be used as the signature without departing from the scope of the present invention.

In some cases, message packets use the entire data field, precluding the ability to append the eight byte message digest. In typical applications, block size negotiations assume 64 bytes for protocol header information. In reality, most protocol headers consume less than 56 bytes, leaving 8 bytes always available for the 8 byte digest information. If eight bytes of free space are not available, an artificially smaller block size is negotiated so that an 8 byte space can be guaranteed.

STATE TRACKING

In addition to the message signature scheme described above, the present invention also provides a method of message authentication using state information. The nature of the MD4 algorithm is such that it is cumulative, i.e. the message digest function can be executed in stages.

For example, a block of a file of messages can be provided to the message digest algorithm, digested and the next block of file can be read in and the digesting continued. The output state of the execution of the digesting algorithm is used as an input state on the next digesting step. The net effect of executing the message digest algorithm in stages is as if the message digest algorithm were executed on an entire block of information in a single pass. Thus, a cumulative effect can be had by remembering the state at the end of each algorithm execution. The present invention takes advantage of this cumulative effect and state information to provide an additional level of security and authentication.

Both the client and server track and store state information. In the present invention, this state information consists of the most recently generated message digest. A provisional message digest, using the current message digest and new message, is generated and stored by the client and server. When a new message is received, a new message digest is generated and compared to the provisional digest. A match is only possible if the other party had the previous state information. The incorrect starting state information will propagate an error that identifies intruders and forged messages.

Figure 4:
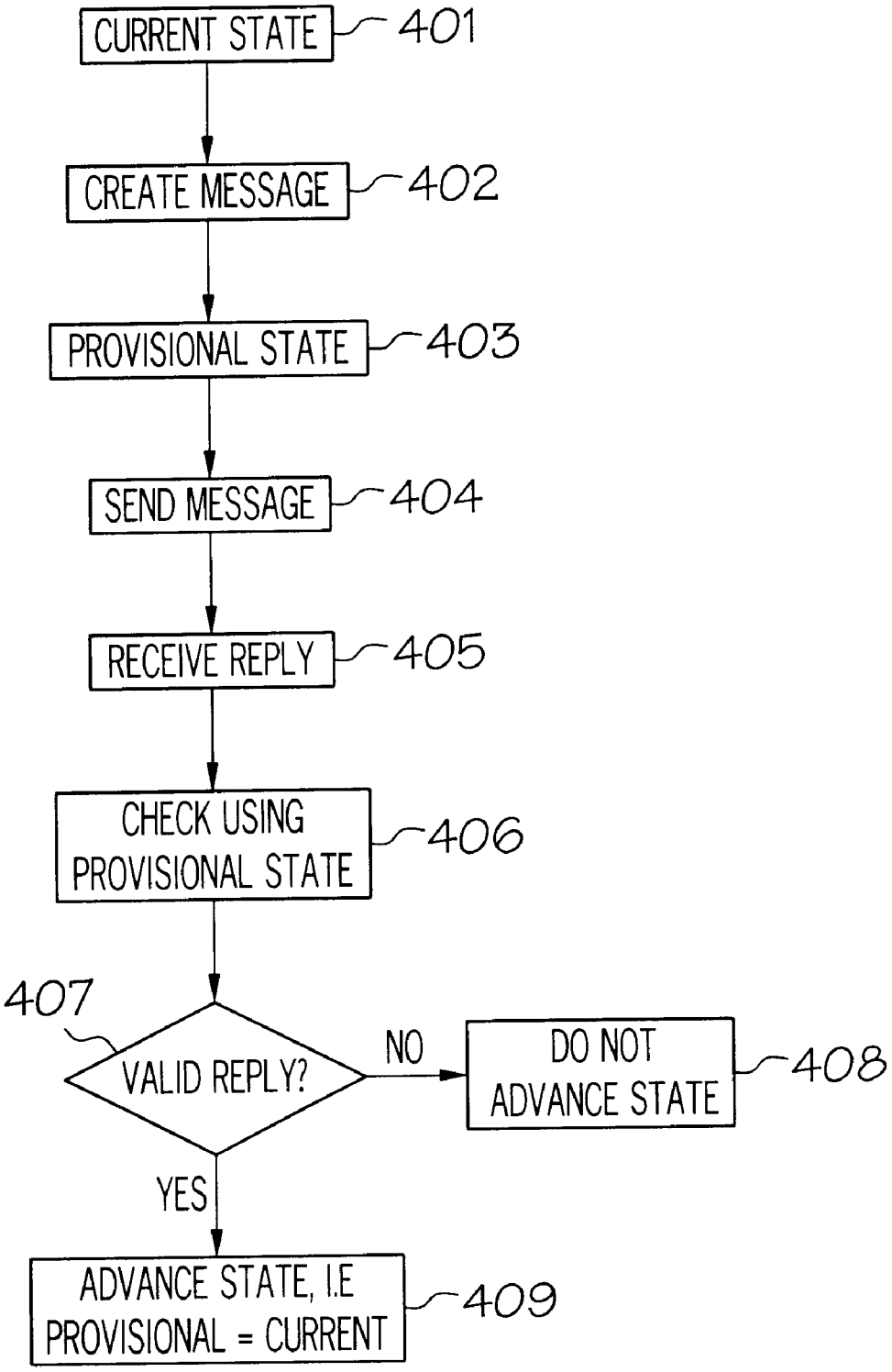
FIG. 4 is a flow diagram of the client state during a message session.

Referring to FIG. 4, a flow diagram of state tracking for a client is illustrated. At step 401, the current state of the client is the full 16 byte message digest generated from a previous valid message. At step 402, the client creates a new message. At step 403, the client applies the message digesting algorithm to the new message, using the current state (digest) as a starting point to create a provisional state.

At step 404, the message is sent to the server. At step 405, the client receives a reply from the server. At step 406, the reply is checked, using the provisional state of step 403. This is accomplished by stripping the server generated digest from the message, applying the message digest algorithm to the message (using the provisional state as a starting point) and comparing the first eight bytes of the resulting digest to the first eight bytes of the server generated digest.

At decision block 407, the argument "valid reply?" is made. If the argument is false, the system proceeds to step 408 and does not advance the state, since an invalid reply has been received. The next message generated by the client will use the existing current state as the starting point for the digesting algorithm. If the argument at decision block 407 is true, the system proceeds to step 409 and advances the state, that is, is makes the provisional state the current state. That new current state will now be the starting point when applying the digesting algorithm to the next message.

In some cases, the client may send a burst of data to the server, or a client request may generate a burst reply. The order of the messages in the packet burst (except for the first packet) is not necessarily fixed. This can create problems in calculating state information, because of the cumulative nature of the digesting algorithm. For packet burst replies, the server calculates the message digest for the first reply packet and uses the same state to calculate message digests for all remaining packets in the burst. In this manner, regardless of the order of packets after the first packet, state integrity can be maintained.

Burst requests are handled the same way. The first packet in a stream is factored in the state of the digest algorithm. Subsequent packets in the burst request use the same state as the first packet as the initial state.

Figure 5:
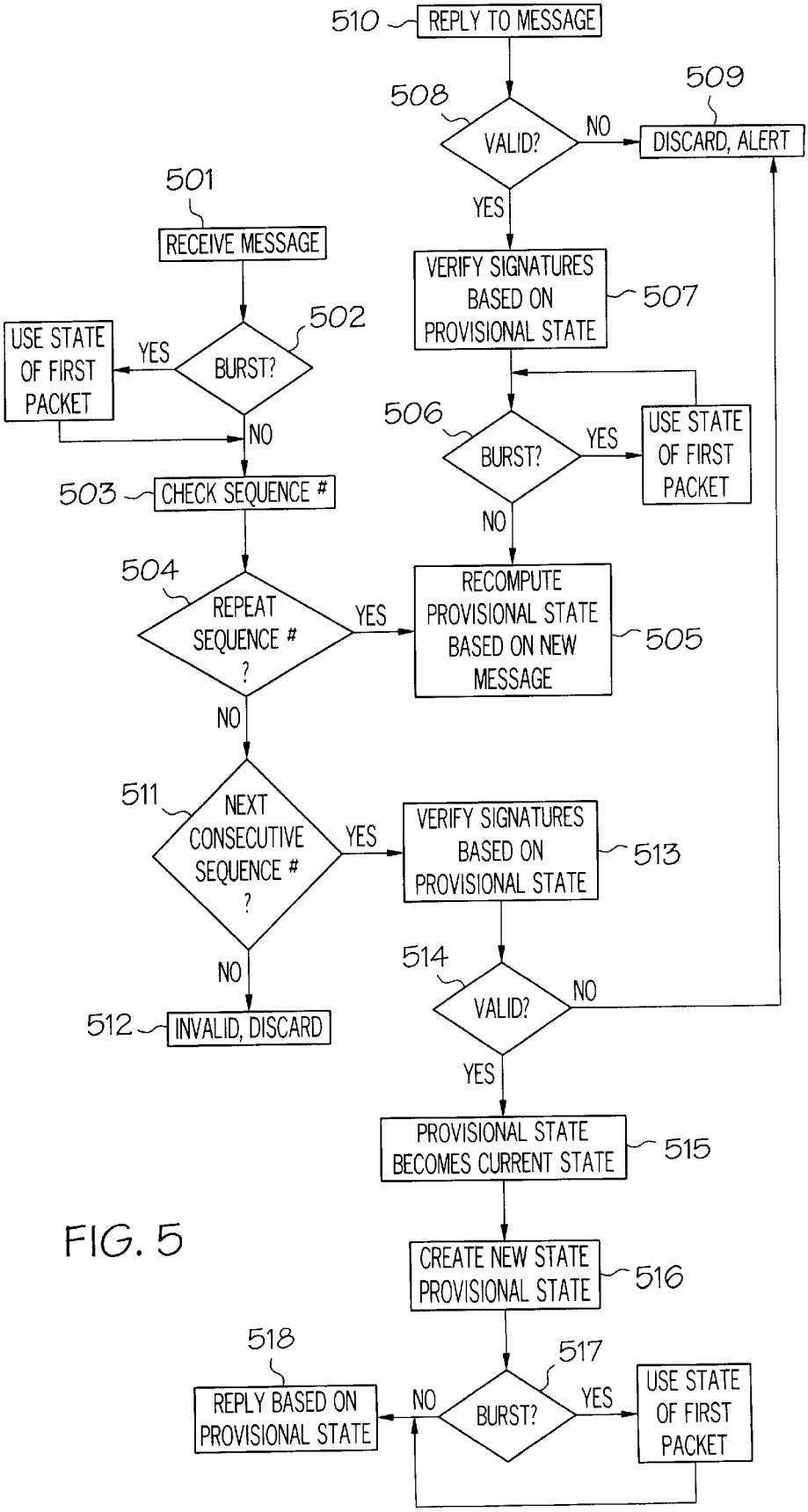
FIG. 5 is a flow diagram of the server state during a message session.

A flow diagram illustrating the operation of the server in maintaining state information is illustrated in FIG. 5. At step 501, the server receives a message from the client. At decision block 502, the argument "burst?" is made. If the argument is true, the system uses the state of the first packet and returns to step 503. If the argument is false, the system proceeds to step 503 and checks the sequence number. At decision block 504, the argument "repeat sequence number?" is made. This is to identify repeat requests. The digest output generated for request packets is always factored into the digest state. Thus, the prior digest state must be maintained by the server when repeat requests are encountered. If the argument at decision block 504 is true, the system proceeds to step 505 and recomputes a provisional state based on the new message, using the stored previous state.

At decision block 506, the argument "burst?" is made. If the argument is true, the system proceeds to step uses the state of the first packet and returns to step 507. If the argument is false, the system proceeds to step 507. At step 507, the signatures of the message are verified based on the provisional state. At decision block 508, the argument "valid?" is made. If the argument is false, the system discards the message and provides an alert for a potential forged message at step 509. If the argument at decision block 508 is true, the system replies to message at step 510.

If the argument at decision block 504 is false, the system proceeds to decision block 511. At decision block 511, the argument "next consecutive sequence number?" is made. If the argument is false, the system proceeds to step 512, declares the message invalid and discards it. In other words, the sequence number was in appropriate. If the argument at decision block 511 is true, the system proceeds to step 513 and verifies the signatures based on the provisional state that has been maintained.

At decision block 514, the argument "valid?" is made. If the argument is false, the system proceeds to step 509, the message is discarded, and an alert is generated. If the argument is true, the system proceeds to step 515. At step 515, the provisional state is redefined as the current state. At step 516, a new provisional state is created based on the reply. At decision block 517, the argument "burst?" is made. If the argument is true, the system uses the state of the first packet and proceeds to step 518. If the argument is false, the system proceeds to step 518 and replies to the client based on the provisional state that has been calculated.

SESSION KEY

Figure 6:
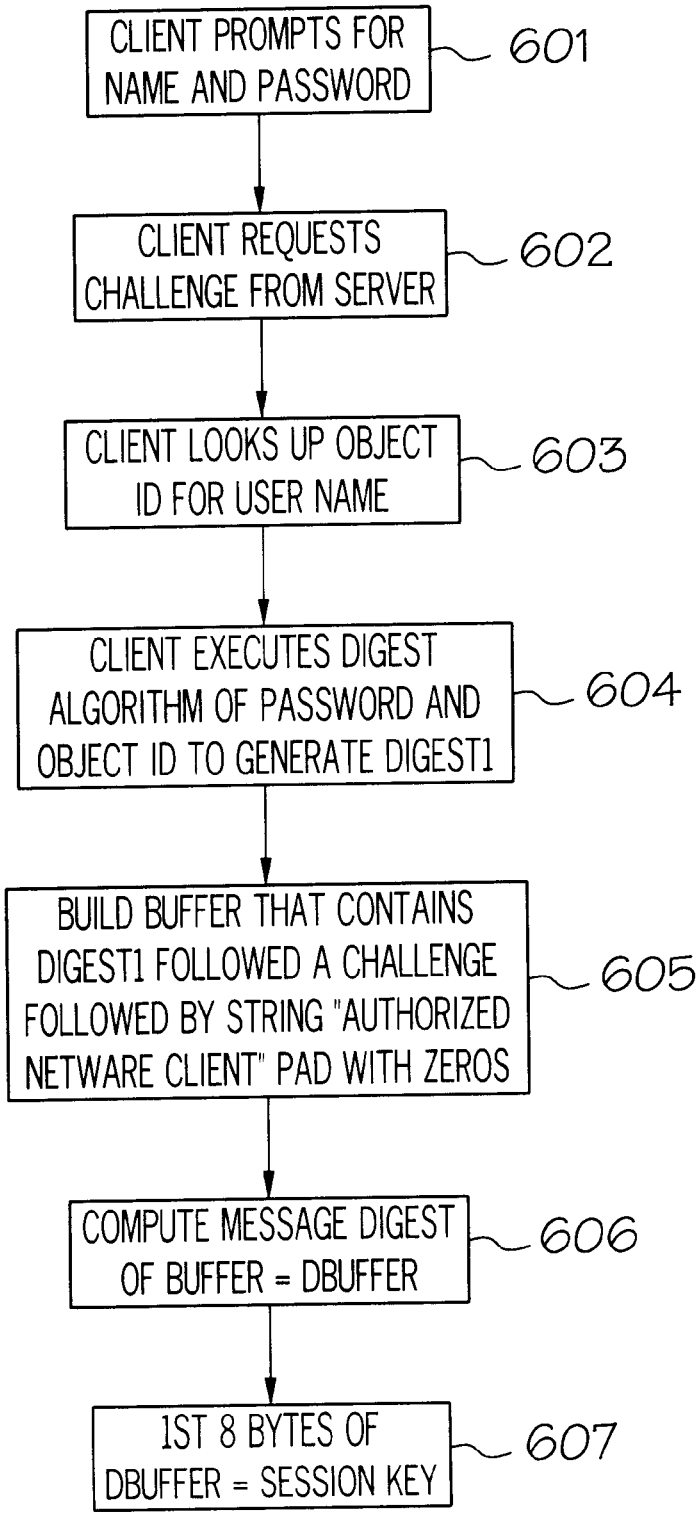
FIG. 6 is a flow diagram illustrating the generation of a session key.

A method of generating a client session key is illustrated in FIG. 6. When a user attempts to communicate on the network, the user must first be identified to the server. To initiate a session, the user attempts to log on to the client machine. At step 601, the client requests a challenge from the server machine. The challenge consists of 8 bytes of random numbers. The client then prompts the user for an account name and a password at step 602. When the user enters an account name and password, the client machine determines an object ID associated with the account at step 603. (The object ID is a numeric surrogate key or index that is associated with each account).

At step 604, the client machine uses the password and the object ID to compute a digest using a digest algorithm to generate a 16 byte result referred to here as Digest1. At step 605, the client machine builds a buffer of Digest1, the challenge and, optionally, a text string. In the preferred embodiment, the text string of the present invention is "Authorized NetWare Client". The buffer is padded with 0's if necessary to provide 64 bytes for execution of the digest algorithm.

At step 606, the client machine performs a second digest on the buffer (Digest1, the challenge, 0's padding, and, optionally, the text string) to generate a digest of the buffer called Dbuffer. At step 607, the first eight bytes of Dbuffer are stripped and defined as the session key. Although eight bytes are used as the session key in the preferred embodiment of the present invention, any number of bytes or bits may be used without departing from the scope of the invention.

The server also has stored the password, account name, and object ID of the user. The server also has generated the challenge, and stores that value. Using the same steps, the server machine can generate the session key. Thus, the session key is never transmitted over the wire. It is a generated from secure information at the client machine and the server machine. In addition, because the session key depends in part on the challenge (a random number) the session key is different for each client/server session.

Although not shown in FIG. 6, a response is generated to the challenge after step 604. The response, which is sent over the wire to the server, is generated by a hashing algorithm that is different from the hashing algorithm that is used in steps 605 and 606. If step 604 is accomplished using the MD4 algorithm, then the challenge response can use, for example, the MD5 algorithm and the session key is generated using the MD4 algorithm. Alternatively, the challenge response can be generated using the MD4 algorithm and the session key can be generated using a different algorithm, such as the MD5 algorithm. Any different digesting or hashing schemes can be used as long as there is no mapping of the output of one algorithm to the output of the other algorithm.

The MD5 algorithm is described in RFC 1321, "The MD5 Message-Digest Algorithm", R. Rivest, MIT Laboratory for Computer Science and RSA Data Security, Inc. April 1992 and incorporated herein by reference.

SESSION KEY AUTHENTICATION

Figure 7:
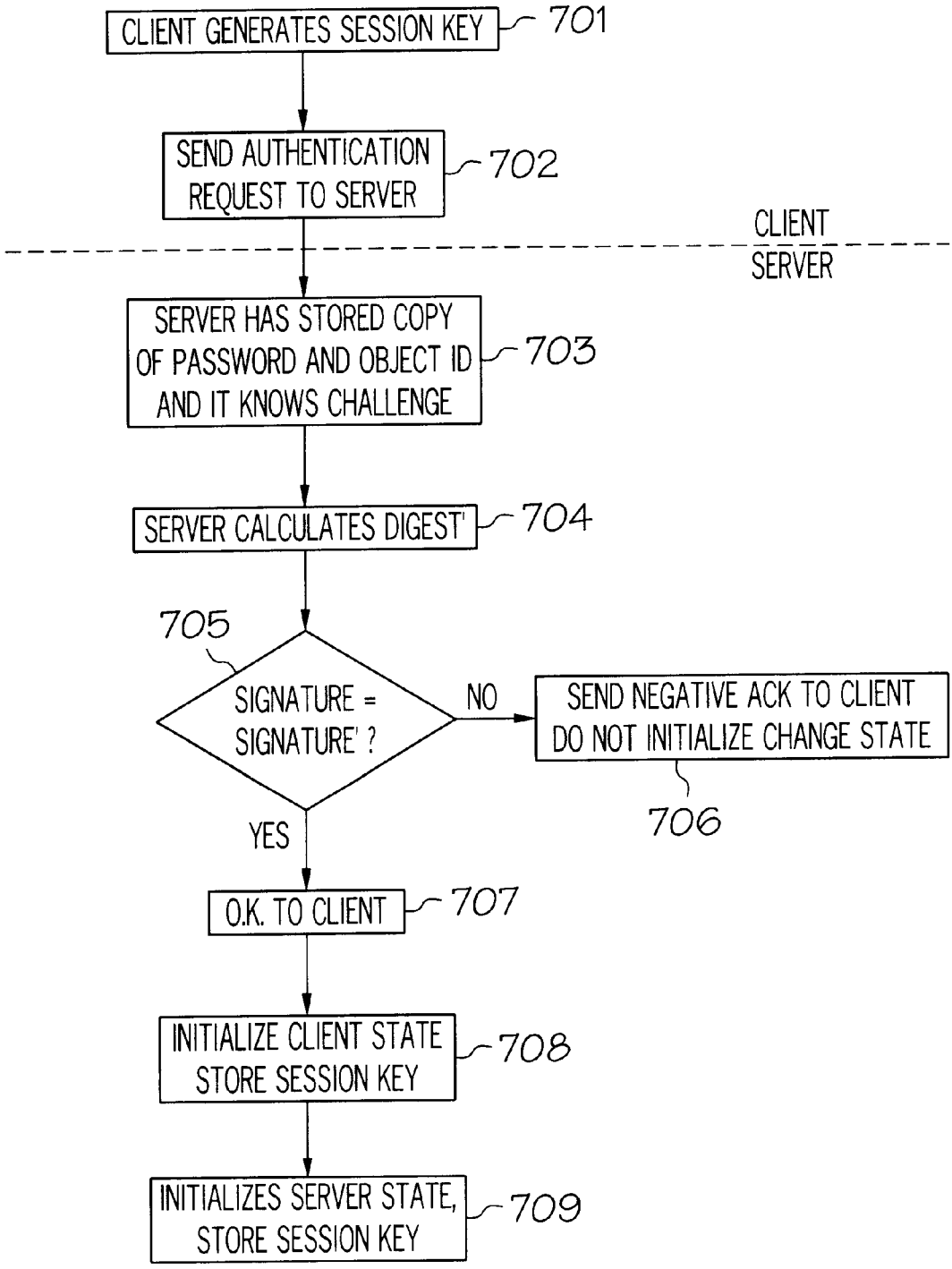
FIG. 7 is a flow diagram of a method of authenticating a session key.

FIG. 7 illustrates a flow diagram of a method of authenticating a session key. At step 701, a client generates a session key as described in connection with FIG. 6. At step 702, a request is sent to the server by the client, using the session key to generate a digest and a signature as described in connection with FIG. 2.

At step 703, the server strips the signature from the message of the client, and uses the server's stored copy of the account name, password, and object ID to first generate its version of Digest1, namely Digest1', and then uses Digest1' to generate the server version of the session key, namely session key'. At step 704, the server generates Digest' as described in connection with FIG. 2.

At decision block 705, the argument "Signature= Signature?" is made!. If the argument is false, the system proceeds to step 706 and the server sends a negative ack to the client and the server does not change its state. The server does not initialize its state for a new session. If the argument at decision block 705 is true, the system proceeds to step 707 and the server sends an "OK" acknowledgement to the client. At step 708, the server initializes the client state and stores the session key it has generated. At step 709, the server initializes the server state and stores the session key. The initial state of the client and server is defined to be an initial state documented, for example, in the MD4 standard.

Figure 8:
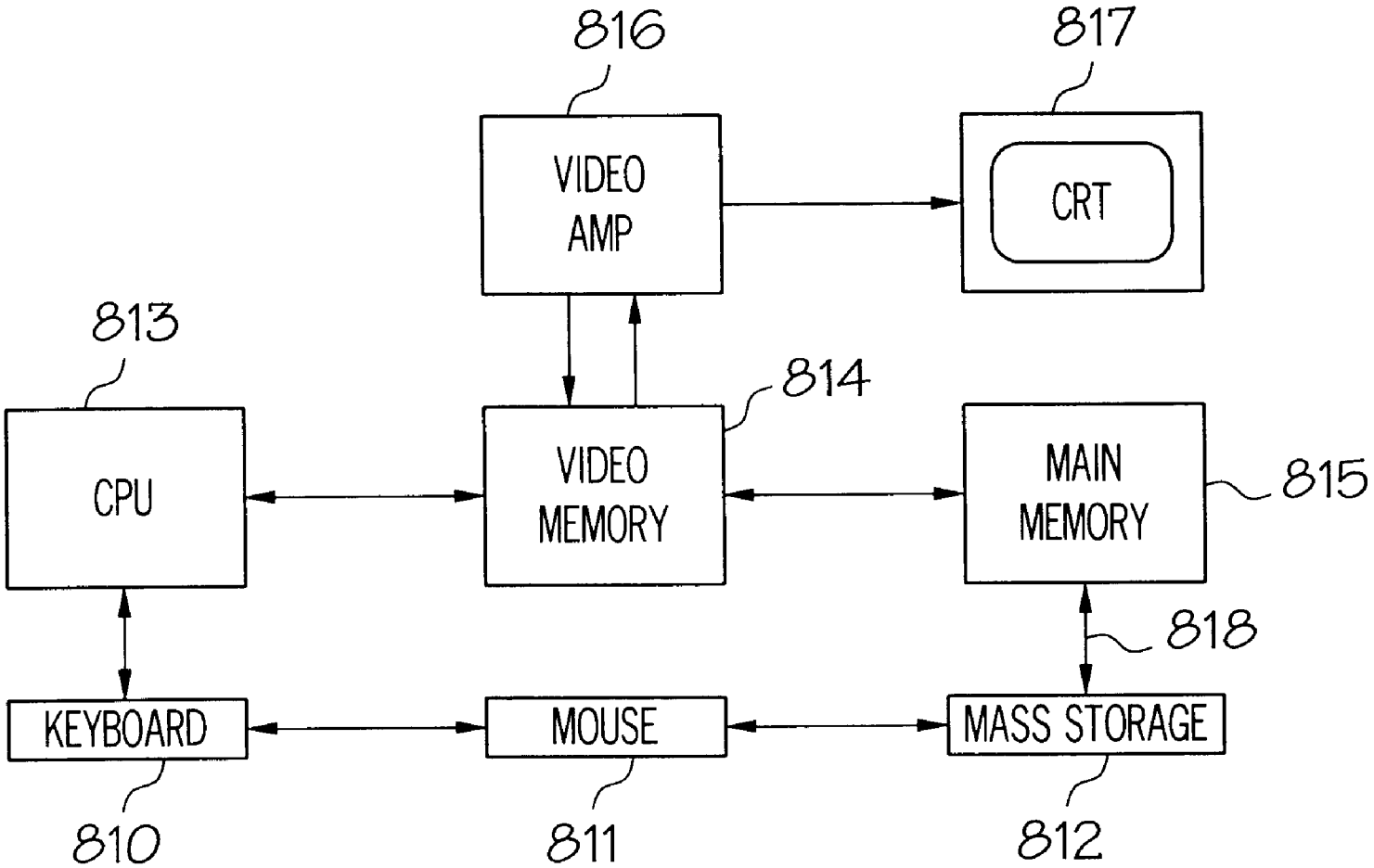
FIG. 8 is a block diagram of a computer system in which the present invention may be implemented.

The client and server of the present invention may be implemented on any conventional or general purpose computer system. An example of one embodiment of a computer system for implementing this invention is illustrated in FIG. 8. A keyboard 810 and mouse 811 are coupled to a bi-directional system bus 818. The keyboard and mouse are for introducing user input to the computer system and communicating that user input to CPU 813. The computer system of FIG. 8 also includes a video memory 814, main memory 815 and mass storage 812, all coupled to bi-directional system bus 818 along with keyboard 810, mouse 811 and CPU 813. The mass storage 812 may include both fixed and removable media, such as magnetic, optical or magnetic optical storage systems or any other available mass storage technology. Bus 818 may contain, for example, 32 address lines for addressing video memory 814 or main memory 815. The system bus 818 also includes, for example, a 32-bit data bus for transferring data between and among the components, such as CPU 813, main memory 815, video memory 814 and mass storage 812. Alternatively, multiplex data/address lines may be used instead of separate data and address lines.

In the preferred embodiment of this invention, the CPU 813 is a 32-bit microprocessor manufactured by Intel, such as the 80386 or 80486. However, any other suitable microprocessor or microcomputer may be utilized. Main memory 815 is comprised of dynamic random access memory (DRAM). Video memory 814 is a dual-ported video random access memory.

One port of the video memory 814 is coupled to video amplifier 816. The video amplifier 816 is used to drive the cathode ray tube (CRT) raster monitor 817. Video amplifier 816 is well known in the art and may be implemented by any suitable means. This circuitry converts pixel data stored in video memory 814 to a raster signal suitable for use by monitor 817. Monitor 817 is a type of monitor suitable for displaying graphic images, and in the preferred embodiment of this invention, has a resolution of approximately 1020×832. Other resolution monitors may be utilized in this invention.

The computer system described above is for purposes of example only. The present invention may be implemented in any type of computer system or programming or processing environment.

Figure 9:
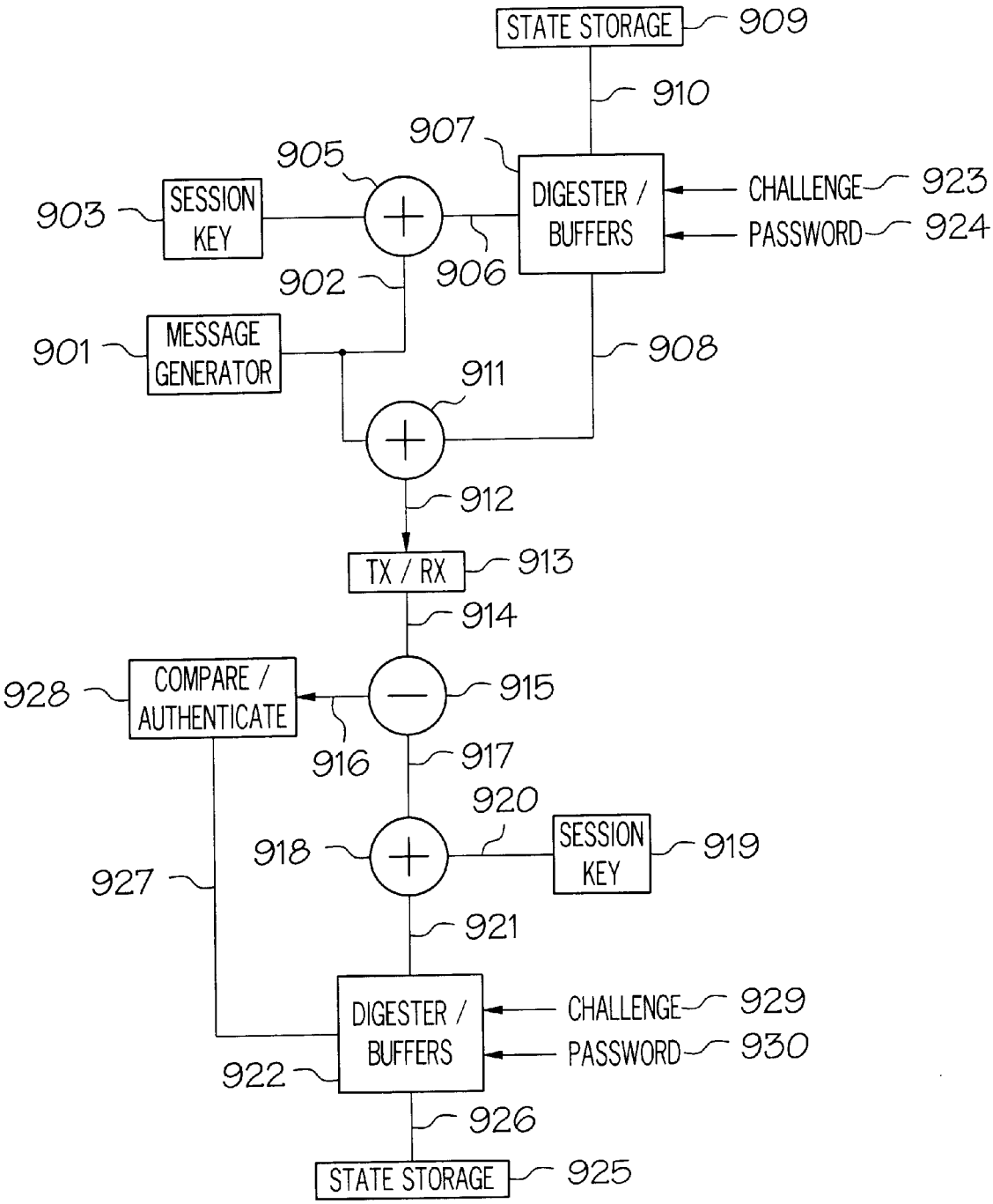
FIG. 9 is a block diagram of the present invention.

A block diagram of the present invention is illustrated in FIG. 9. A message generator 901 is a source of messages from a sending station to a receiving station. In this example, the sending station is a client and the receiving station is a server. The message generator 901 provides a message 902. A session key 904 is stored in session key storage 903. The session key 904 is preappended to the message 902 at summer 905, resulting in appended message 906. Appended message 906 is provided to the digester/buffer block 907, where it is digested and the first eight bytes are used as a signature 908. Signature 908 is combined with message 902 at summer 911, resulting in signed message 912. Signed message 912 is coupled to a receiving station through transmitter/receiver 913.

State storage 909 stores the current and provisional states of the sending station and provides them on line 910 to the digester/buffer block 907 as needed. A challenge 923 and local password 924 are also provided to the digester/buffer block 907 for generation of the session key 904 on initialization of a session.

The received signed message 914 is separated into signature 916 and message 917 elements at subtractor 915. The message 917 is combined with a session key 920 from session key storage 919 at summer 918, resulting in an appended message 921. Appended message 921 is provided to digester/buffer 922, where it is digested. The first eight bytes of the digest define a signature 927. The signature 927 is provided to compare/authenticate block 928, along with the signature 916 of the received message 914. The compare/signature block compares signature 927 with signature 916. When the signatures match, a valid message is indicated. If the signatures do not match, the message is declared invalid and discarded.

State information for the digesting operation of digester/buffer 922 is provided on line 926 from state storage 925. A challenge 929 and password 930 are also provided to digester/buffer 922 for generation of a session key.

The elements of FIG. 9 can be implemented as executable instructions in a processing means.

Thus, a method and apparatus for authentication of client/server communication has been described.

Claims of the invention:

I claim:

1. A method of authenticating a message transmitted between a sender and a receiver comprising the steps of:

generating a message at said sender;

combining a session key with said message to create a first appended message;

calculating a first digest of said first appended message;

combining a first portion of said first digest with said message to create a transmit message;

transmitting said transmit message to said receiver;

removing said first portion of said first digest from said transmit message to result in said message;

combining said session key with said message to generate a second appended message;

calculating a second digest of said second appended message;

comparing said [said] *first* portion of said first digest and a second portion of said second digest;

authenticating said message when said first portion of said first digest matches said second portion of said second digest.

2. The method of claim I wherein said sender is a client in a client/server network.

3. The method of claim 1 wherein said receiver is a server in a client/server network.

4. The method of claim 1 wherein said step of calculating a first digest of said first appended message is accomplished by executing a digest algorithm on said first appended message.

5. The method of claim 4 wherein said digest algorithm is an MD4 digest algorithm.

6. The method of claim 4 wherein a current state of said sender is used as an initial state when executing said digest algorithm to create said first digest.

7. The method of claim 6 wherein said current state is used as an initial state when executing said digest algorithm to create said second digest.

8. The method of claim 7 wherein said current state is advanced when an authenticated message is received.

9. The method of claim 8 wherein said current state is not advanced when an authenticated message is not received.

10. The method of claim 1 wherein said session key is generated by the steps of:

providing a random number sequence challenge to said sender;

requesting a password from a user of said sender;

generating a first pass digest from said password;

combining said first pass digest and said challenge in a buffer; generating a buffer digest of said buffer;

defining said session key as a first number of bytes of said buffer digest.

11. Apparatus for authenticating a message transmitted between a sender and a receiver comprising:

means for generating a message at said sender;

means for combining a session key with said message to create a first appended message;

means for calculating a first digest of said first appended message;

means for combining said a first portion of said first digest with said message to create a transmit message;

means for transmitting said transmit message to said receiver;

means for removing said first portion of said first digest from said transmit message to result in said message;

means for combining said session key with said message to generate a second appended message;

means for calculating a second digest of said second appended message;

means for comparing said [said] *first portion of said first digest and a second portion of said second digest;* means for authenticating said message when said first portion of said first digest matches said second portion of said second digest.

12. The apparatus of claim 11 wherein said sender is a client in a client/server network.

13. The apparatus of claim 11 wherein said receiver is a server in a client/server network.

14. The apparatus of claim 11 wherein said first digest of said first appended message is calculated by executing a digest algorithm on said first appended message.

15. The apparatus of claim 14 wherein said digest algorithm is an MD4 digest algorithm.

16. The apparatus of claim 14 wherein a current state of said sender is used as an initial state when executing said digest algorithm to create said first digest.

17. The apparatus of claim 16 wherein said current state is used as an initial state when executing said digest algorithm to create said second digest.

18. The apparatus of claim 17 wherein said current state is advanced when an authenticated message is received.

19. The apparatus of claim 18 wherein said current state is not advanced when an authenticated message is not received.

20. The apparatus of claim 11 further including means for generating a session key comprising:

means for providing a random number sequence challenge to said sender;

means for requesting a password from a user of said sender;

means for generating a first pass digest from said password;

means for combining said first pass digest and said challenge in a buffer;

means for generating a buffer digest of said buffer;

means for defining said session key as a first number of bytes of said buffer digest.

*21. A method of authenticating a message transmitted between a sender and a receiver, comprising the steps of:*

*generating a message at a sender;*

*combining a session key with said message to create a first appended message;*

*creating a first hash of said first appended message;*

*combining at least a portion of said first hash with said message to create a transmit message;*

*transmitting said transmit message to a receiver;*

*determining from the transmit message said portion of said first hash and said message;*

*combining said session key with said message to generate a second appended message;*

*creating a second hash of said second appended message;*

*comparing only a portion of said first hash and a corresponding portion of said second hash; and*

*authenticating said message when said portion of said first hash matches said corresponding portion of said second hash.*

*22. The method of claim 21, wherein said sender is a client in a client/server network.*

*23. The method of claim 21, wherein said receiver is a server in a client/server network.*

*24. The method of claim 21, wherein the steps of creating involve calculating.*

*25. The method of claim 24, wherein said step of calculating a first hash of said first appended message is accom-*

*plished by executing a digest algorithm on said first appended message.*

*26. A method of generating a session key, in a computer system comprising the steps of:*

*providing a random number sequence;*

*requesting a password from a user;*

*creating a first hash from said password;*

*combining said first hash and said sequence;*

*creating a second hash of said combined first hash and sequence; and*

*defining a session key as a portion of said second hash.*

*27. A session key generated by the method of claim 26.*

*28. The method of claim 26, wherein the steps of creating involve calculating.*

*29. The method of claim 26, wherein the hashes are digests.*

*30. A method of authenticating a message transmitted between a sender and a receiver, comprising the steps of:*

*generating a message at a sender;*

*combining a session key with said message to create a first appended message;*

*creating a first hash of said first appended message using a current state as an initial state;*

*combining at least a portion of said first hash with said message to create a transmit message;*

*transmitting said transmit message to a receiver;*

*determining from said transmit message said portion of said first hash and said message;*

*combining said session key with said message to generate a second appended message;*

*creating a second hash of said second appended message using said current state as an initial state;*

*comparing said portion of said first hash and at least a portion of said second hash; and*

*authenticating said message when said portion of said first hash matches said portion of said second hash.*

*31. The method of claim 30, wherein said current state is advanced when an authenticated message is received.*

*32. The method of claim 30, wherein said current state is not advanced when an authenticated message is not received.*

*33. The method of claim 30, wherein the portions of the first and second hashes are the entire first and second hashes, respectively.*

*34. The method of claim 30, wherein the hashes are digests.*

*35. A computer system for authenticating a message transmitted between a sender and a receiver, comprising:*

*a first computer having:*

*means for generating a message;*

*means for combining a session key with said message to create a first appended message;*

*means for creating a first hash of said first appended message;*

*means for combining at least a portion of said first hash with said message to create a transmit message;*

*means for transmitting said transmit message;*

*a second computer having:*

*means for receiving said transmit message;*

*means for determining from the transmit said portion of said first hash and said message;*

*means for combining said session key with said message to generate a second appended message;*

*means for creating a second hash of said second appended message;*

*means for comparing only a portion of said first hash and a corresponding portion of said second hash; and*

*means for authenticating said message when said portion of said first hash matches said corresponding portion of said second hash.*

*36. The computer system of claim 35, wherein said sender is a client in a client/server network.*

*37. The computer system of claim 35, wherein said receiver is a server in a client/server network.*

*38. The computer system of claim 35, wherein the hashes are digests.*

*39. A computer system for authenticating a message transmitted between a sender and a receiver, comprising:*

*a first computer having:*

*means for generating a message;*

*means for combining a session key with said message to create a first appended message;*

*means for creating a first hash of said first appended message using a current state as an initial state;*

*means for combining at least a portion of said first hash with said message to create a transmit message;*

*means for transmitting said transmit message;*

*a second computer having:*

*means for receiving said transmit message;*

*means for determining from said transmit message said portion of said first hash and said message;*

*means for combining said session key with said message to generate a second appended message;*

*means for creating a second hash of said second appended message using said current state as an initial state;*

*means for comparing said portion of said first hash and at least a portion of said second hash; and*

*means for authenticating said message when said portion of said first hash matches said portion of said second hash.*

*40. The computer system of claim 39, wherein said current state is advanced when an authenticated message is received.*

*41. The computer system of claim 39, wherein said current state is not advanced when an authenticated message is not received.*

*42. The computer system of claim 39, wherein the portions of the first and second hashes comprise the entire first and second hashes, respectively.*

*43. A computer readable medium comprising a program capable of authenticating a message transmitted between a sender and a receiver by performing the steps of:*

*generating a message at a sender;*

*combining a session key with said message to create a first appended message;*

*creating a first hash of said first appended message;*

*combining at least a portion of said first hash with said message to create a transmit message;*

*transmitting said transmit message to a receiver;*

*determining from the transmit message said portion of said first hash and said message;*

*combining said session key with said message to generate a second appended message;*

*creating a second hash of said second appended message;*

*comparing only a portion of said first hash and a corresponding portion of said second hash; and*

*authenticating said message when said portion of said first hash matches said corresponding portion of said second hash.*

*44. A computer readable medium comprising a program capable of authenticating a message transmitted between a sender and a receiver by performing the steps of:*

*generating a message at a sender;*

*combining a session key with said message to create a first appended message;*

*creating a first hash of said first appended message using a current state of said sender as an initial state;*

*combining at least a portion of said first hash with said message to create a transmit message;*

*transmitting said transmit message to a receiver;*

*determining from said transmit message said portion of said first hash and said message;*

*combining said session key with said message to generate a second appended message;*

*creating a second hash of said second appended message using said current state as an initial state;*

*comparing said portion of said first hash and at least a portion of said second hash; and*

*authenticating said message when said portion of said first hash matches said portion of said second hash.*

* * * * *